April 21, 1959     E. F. LEABERRY ET AL     2,882,568
LINING FOR INGOT MOLDS

Filed Oct. 12, 1954     6 Sheets-Sheet 1

INVENTORS
ERNEST F. LEABERRY
HAROLD F. HENDERSHOT
PAUL H. EDWARDS
BY
ATTORNEY

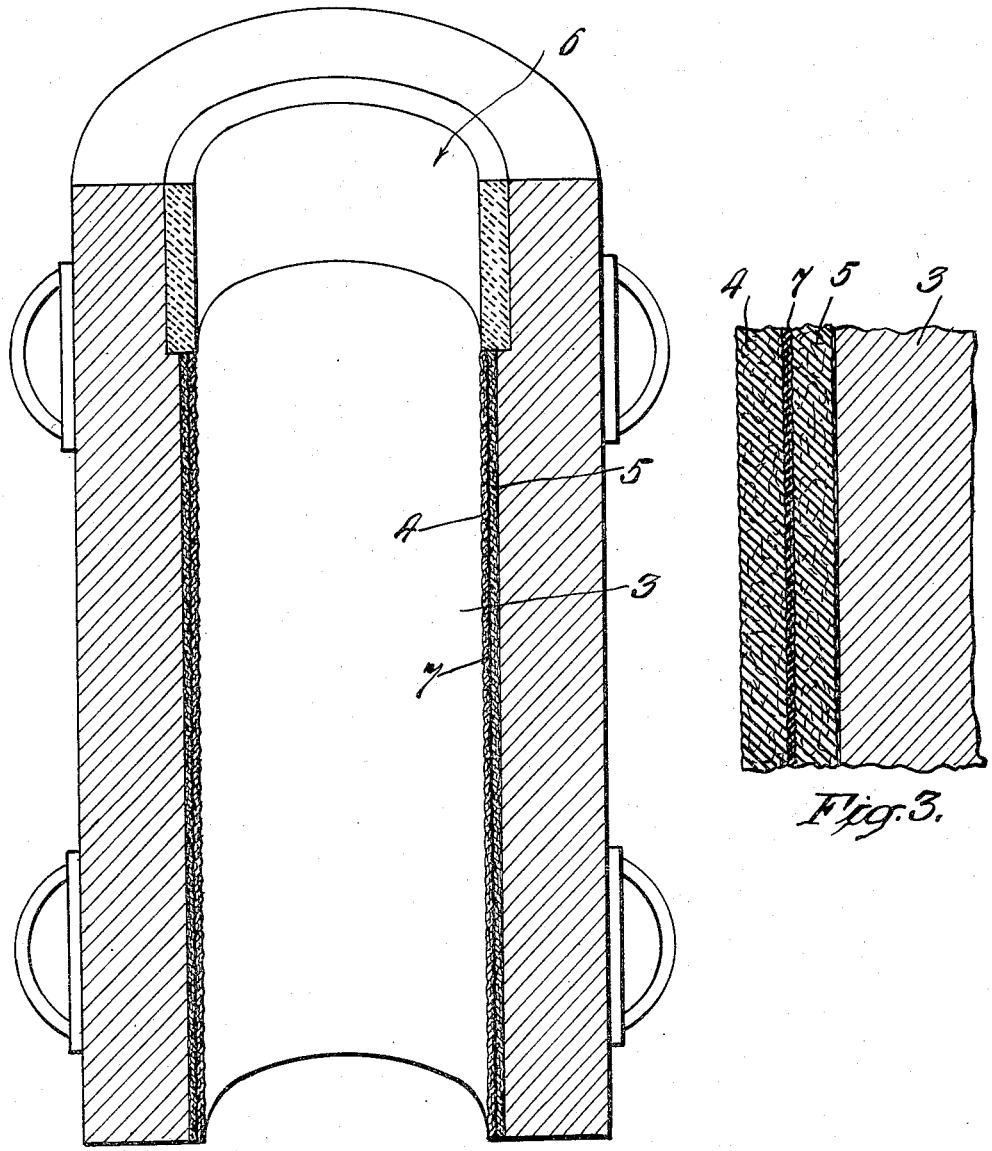

April 21, 1959 E. F. LEABERRY ET AL 2,882,568
LINING FOR INGOT MOLDS

Filed Oct. 12, 1954 6 Sheets-Sheet 4

INVENTORS
ERNEST F. LEABERRY
HAROLD F. HENDERSHOT
PAUL H. EDWARDS
BY
ATTORNEY

INVENTORS
ERNEST F. LEABERRY
HAROLD F. HENDERSHOT
PAUL H. EDWARDS
BY
ATTORNEY

United States Patent Office 2,882,568
Patented Apr. 21, 1959

2,882,568

LINING FOR INGOT MOLDS

Ernest F. Leaberry and Harold F. Hendershot, Huntington, W. Va., and Paul H. Edwards, Procterville, Ohio, assignors to The International Nickel Company, Inc., New York, N.Y., a corporation of Delaware Application October 12, 1954, Serial No. 461,868

10 Claims. (Cl. 22—139)

The present invention relates to molds and mold linings employed in the production of metal castings and to a method for producing metal castings of improved quality.

Many methods have been proposed for preparing mold cavities for receiving molten metal in the production of metallurgically sound ingots or castings. Such proposed mold preparations usually involved applying to the wall or walls defining a mold cavity or chamber an adherent coating in an attempt to protect the mold from the erosive action of molten metal during pouring, to prevent the metal ingot or casting from sticking to the mold, to provide heat insulation for the mold, to prevent cracking or surface burning of the mold and to increase mold life, to control the cooling rate of the molten metal, to produce sound metal castings, to enable non-metallic inclusions in the molten metal to separate from the metal by gravimetric separation, and to provide castings as free as possible from surface discontinuities and defects, non-metallic inclusions, center porosity, excessive piping, etc.

In attempting to achieve the foregoing, the practice usually proposed was to apply to the surface of a mold cavity a mold coating comprised usually of a suspension of finely divided material in a liquid vehicle. Such mold coating materials included a fluid suspension of finely divided magnesium oxide, diatomaceous silica, graphite, certain types of clays, silicate slags, etc., and generally were applied by spraying, by brushing, or by other suitable coating means. Other methods which were also employed to produce a coating on the mold, i.e., in situ and in intimate contact therewith, included dipping, slushing, etc., to provide a coating or shell adhering to the surface of the mold.

While the foregoing method of producing a mold coating has been partially successful in overcoming certain casting difficulties, there were certain disadvantages in such methods, particularly when such methods were employed in producing castings of high melting point metals, such as heat resistant alloys containing substantial amounts of alloying ingredients. Generally, it was found that such mold coatings had a tendency to spall and crumble away from the mold wall when the mold was subjected to mechanical and/or thermal shock. For example, the mold coating might spall or crumble during the pouring of hot metal, thus exposing bare metal surface in the mold cavity to the action of the hot molten metal which would either partially fuse to the exposed mold surface or cause partial erosion thereof. In some instances, fragments of the mold coating would be folded into or entrapped in the rapidly chilled surface of the poured metal adjacent the mold surface such that the resulting solidified ingot woud have a rough surface containing discontinuities, cold shuts, and other defects, etc., which necessitated considerable overhauling of the ingot in order to prepare it for subsequent mechanical working operations, such as forging, extruding, etc. In fact, it was found from experience that it was more desirable to employ uncoated molds than the coated molds proposed heretofore. In many instances, it was found that cleaner metal was obtained more consistently when an uncoated mold was employed.

Generally, it was difficult to maintain a slow enough cooling rate of the poured metal such that non-metallic inclusions present in the poured metal would be enabled to separate from the molten metal before solidification, with the result that the cast metal usually had an undesirably high inclusion count and other defects which deleteriously affected the quality of the metal. This was particularly true in the casting of long extrusion billets of heat resistant alloys, e.g., nickel-chromium alloy billets measuring about 7 to 13 inches in diameter and about 25 to 60 inches in length. Because of these disadvantages, metal cast by conventional procedures usually required considerable overhauling (i.e., removal of surface defects by machining, chipping, grinding, etc.) at various stages of manufacture and yet, even in spite of the overhauling, the amount of metal recovered in the final product was not always satisfactory on the basis of the weight of metal cast. In some instances, the resulting metal produced had to be entirely scrapped because of poor quality. It was not uncommon to obtain unsatisfactory yields in the production of heat resistant, nickel-chromium, nickel-chromium-iron and nickel-chromium-cobalt alloys (whether nickel-base, cobalt-base or iron-base alloys) containing such alloying ingredients as aluminum, titanium, molybdenum, tungsten, columbium, zirconium, boron, etc. In many instances, such alloys were difficult to treat in subsequent working operations (e.g., hot forging, hot rolling, hot drawing, and other hot working operations) due to unsatisfactory internal and external quality as a result of improper casting procedures. Various types of molds were tried to overcome these difficulties but none seemed satisfactory. For example, in an attempt to reduce piping and center porosity, hot-topped molds were resorted to. One type of hot top comprised a collar or annulus of insulating refractory material which was inserted or fitted into the top of the mold onto a supporting ledge or recess in the mold. The purpose of the hot top was to delay freezing of the molten metal near the top of the mold long enough so as to maintain a reservoir of molten metal near the top, for example, to feed molten metal into the center of the ingot during solidification. While the hot top tended to decrease piping and center porosity generally, it was not always possible to minimize piping and center porosity sufficiently when producing narrow ingots of heat resistant alloys of the type referred to hereinbefore. Even when an exothermic material was used in combination with the hot top, i.e., a material that would exothermically heat up to a high temperature when contacted by molten metal, piping and center porosity would still occur to some extent in such ingots.

Although many attempts were made to overcome the foregoing difficulties and other disadvantages, none, as far as we are aware, was entirely successful when carried into practice commecrially on an industrial scale.

It has now been discovered that ingots or castings of improved quality can be produced by employing a novel mold lining which does not have the disadvantages of conventional mold coatings whereby ingots or castings can be produced in accordance with the invention which require minimum overhauling and whereby certain difficultly hot-workable heat resistant and other types of alloys can be produced having improved hot-workability or superior metallurgical quality as a result of employing the invention.

It is an object of the present invention to provide as an article of manufacture an improved mold lining for use in producing metal ingots and castings of good metallurgical quality.

Another object of the invention is to provide a mold lining characterized by having improved resistance to thermal and mechanical shock, including improved resistance to spalling, crumbling, breaking, etc.

The invention also contemplates providing an improved mold lining for use in producing metal ingots having greatly minimized piping and center porosity.

It is a further object of the invention to provide a lined mold for producing clean metal castings of high quality from molten metal.

The invention further contemplates providing an improved method for producing metal castings, said castings being characterized by having improved surface quality and by requiring minimum overhauling as compared to castings produced by conventional casting procedures.

It is another object of the invention to provide a method for casting difficultly hot-workable heat resistant alloys into lined molds whereby such alloys can be hot worked to produce a high yield of final product of improved metallurgical quality.

Other objects and advantages will become apparent from the following description taken in conjunction with the accompanying drawing in which:

Fig. 2 is a longitudinal sectional view of an embodiment of a lined casting mold as provided by the invention;

Fig. 3 is an enlarged fragmentary sectional view of a portion of the lined mold shown in Fig. 2 on an exaggerated scale for purposes of clarity;

Figure 10:
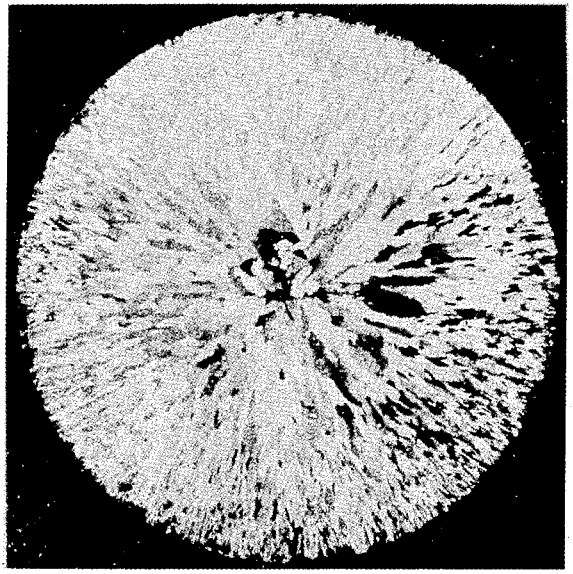
Figure 11:
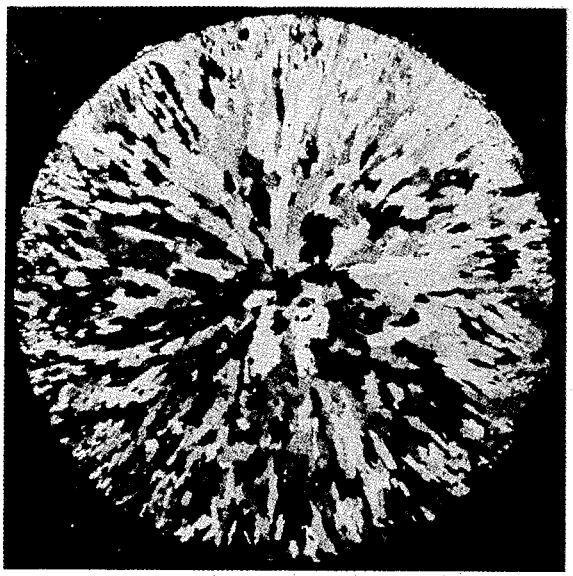
Figure 12:
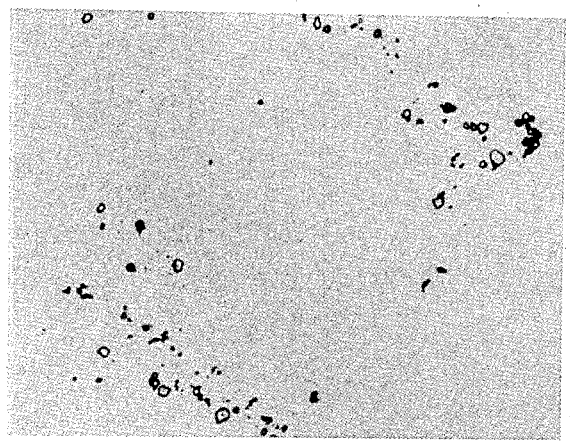
Figure 13:
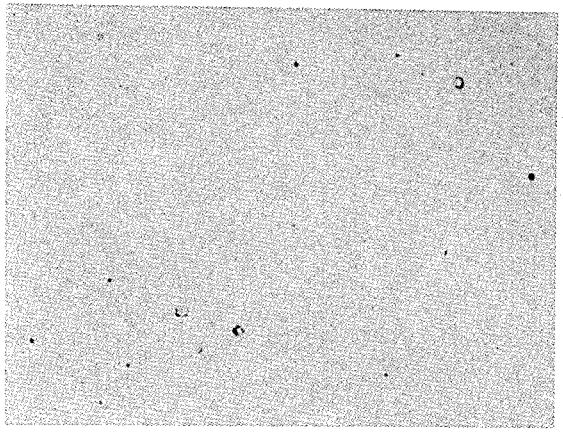

Figs. 10 and 11 are reproductions of photographs taken at about one-half actual size showing, respectively, transverse sections of cast ingots produced by a prior procedure and produced in accordance with the invention; and Figs. 12 and 13 are reproductions of photomicrographs taken at 500 diameters depicting, respectively, the microstructure of an alloy which was cast in accordance with conventional practice and of the same alloy cast in accordance with the present invention.

Generally speaking, the present invention contemplates a mold lining and a casting process employing the same in combination with a mold in the production of substantially clean, sound metal castings or ingots from molten metal, said mold lining comprising a unitary, flexible, sleeve-like structure of a substantially porous, fibrous, non-combustible, inorganic, glass-like material capable of at least partially fusing when contacted by hot molten metal during teeming and casting. The invention also contemplates a mold in combination with such a mold lining. While generally the lining is employed in combination with a metal mold, it may also be employed in combination with other molds, such as graphite and ceramic molds.

The present invention is based upon the discovery that improved castings, particularly of heat resistant, chromium-containing alloys, can be obtained by pouring hot molten metal into a mold which has previously been lined with a separate, unitary, sleeve-like structure inserted into the mold and made of a matting of the aforesaid fibrous material. This matting may be made by felting, weaving, interlacing or otherwise intermingling glass-like fibers. The thus-produced matting is then formed into the sleeve-like structure which may either be seamed or seamless and which has considerable flexibility. The sleeve-like structure may have one end closed like a stocking, the closed end corresponding to the toe end of the ingot to be cast. Unlike prior art mold coatings which are generally prepared in situ in intimate contact with the mold and as an integral part of the mold surface, the flexible mold lining provided by the invention is characterized by having improved resistance to thermal and mechanical shock and is not prone to substantially spall, crumble, etc., and substantially eliminates sticking of the ingot or other casting to the mold wall. The unitary mold lining comprises a flexible sleeve-like structure having an internal surface which the molten metal contacts during casting and an external surface which conforms substantially to the internal configuration of the mold. It is particularly preferred that the external surface of the fibrous sleeve be provided with a back-up coating comprised of high melting point (relatively higher than that of the metal being cast), substantially stable and inert, inorganic, refractory coating material, preferably a high melting point refractory oxide. The expression "refractory oxides" employed herein includes oxygen-containing refractory materials, such as refractory oxides per se, refractory silicates, refractory aluminates and combinations thereof. Substantially inert, oxygen-containing refractory coating materials comprise zircon, magnesia, alumina, high alumina clays such as kaolin or china clay, and other refractory materials such as sillimanite, topaz, ganister, magnesite, olivine, chromite, zirconia, etc. Such materials preferably have a melting or softening point of at least about 100° F. higher than the temperature of the metal being cast.

The fibrous sleeve may be employed in the mold without using a back-up coating of a refractory material on its external surface provided care is taken in the handling of the sleeve during its insertion into the mold so that the uncoated sleeve does not fold in upon itself during the pouring of molten metal. When a back-up coating, such as one made of refractory cement material, is applied to the outer surface of the fibrous sleeve, handling of the resulting composite mold lining is greatly facilitated and other improved results are obtained. The mold lining provided by the invention, especially the refractory-coated fiber glass sleeve, can be produced in quantity and used immediately at the site of casting merely by inserting the sleeve into the mold without requiring the usual preparation of the mold wall or surface.

In carrying the invention into practice, the mold lining is preferably comprised of flexible, fiber glass matting, e.g., a matting which may comprise a fabric of woven fiber glass, a felted mass of glass fibers, etc. The matting is formed into a sleeve having an internal, fiber glass surface which at least partially fuses when contacted by molten metal during teeming and casting, and an external surface coated with a high temperature refractory, preferably zircon, said external surface of the mold lining corresponding substantially to the internal configuration of the mold such that when the sleeve is inserted as a lining into the mold, the coated external surface of the mold lining is in partial contact with the internal surface of the mold cavity. In other words, the unitary mold lining provided by the invention is not in intimate contact or integral with the mold surface as the external surface of the mold lining is somewhat rough and as a result the contact between the external surface of the lining and the mold wall is generally at the high points of the rough surface of the lining. This is also true in the case of the uncoated fibrous sleeve as generally its external surface has a substantially uniform distribution of high and low points resulting from the intermingling, felting, weaving, etc., of the fibrous material. Thus, generally, an air gap will exist over that part of the interface which prevails between the mold surface and the external surface of the lining not in contact therewith. Among the other advantages, the air gap or space has the further advantage in that it serves as a vent for gaseous products escaping from the melt and thus helps to minimize the formation of blow holes in the ingot.

The sleeve-like mold lining may be produced in various transverse cross-sectional shapes depending upon the transverse cross-sectional shape of the ingot or casting to be produced. For example, the sleeve-like mold lining may have a transverse cross section whose peripheral outline corresponds to a circle, an ellipse, a triangle, a square, a rectangle, or other shapes, depending upon the shape of the ingot to be cast.

A satisfactory method of producing a unitary mold lining from a fiber glass matting for use in casting billets having improved metallurgical quality comprises cutting the fiber glass matting, which can be in sheet form, to the appropriate size and wrapping it about a prepared form, corresponding substantially to the desired shape of the ingot, to form a sleeve having a seam comprising either a lap or butt joint held together by a suitable adhesive, such as sodium silicate, etc. A fiber glass mat which has been found appropriate in producing a sleeve is one having a thickness of about one-eighth of an inch and a weight corresponding to about three ounces per square foot. Good results have been obtained with a fiber glass comprising about 53% $SiO_2$, about 10.4% $B_2O_3$, about 16.8% CaO, about 14.8% total of $Fe_2O_3$ and $Al_2O_3$, about 4.4% MgO, about 0.3% $K_2O$ and about 0.3% $Na_2O$. Such a fiber glass has a softening point of about 1550° F. and a fluid point of about 2450° F. At 2600° F., the glass has a viscosity of about 60 poises and at 2200° F., a viscosity of 900 poises.

After forming the sleeve, the external surface thereof (i.e., the mold contacting side of the lining) is preferably coated with a refractory cement slurry which is preferably a mixture comprising a suspension of powdered zircon in a binder solution. A suitable cement mixture is one containing zircon in the amount of about 84% by weight suspended in a plastic binder solution. The plastic binder solution may comprise about 16% to 25% by weight of a phenolic resin dissolved in water or alcohol. Examples of materials which may be employed as binders are various phenolic resins, including phenolic resins sold under the trade-mark "Bakelite." Examples of other materials which may be employed as binders include sodium silicate, bentonite, thin solutions of mucilage, linseed oil, shellac, lacquer, starch, varnish, etc. The amount of refractory coating employed in coating the external surface of the sleeve-like lining depends upon the amount of rigidity required in the sleeve after drying and setting. It has been found that from about 0.1 pound to one pound of refractory coating per square foot of coated surface after setting and drying gives satisfactory results. The binder preferably should not be one which softens appreciably during the teeming of the metal in the lined mold as the sleeve may lose its form before the mold is completely filled with the molten metal.

After the fibrous sleeve lining has been coated and dried, the sleeve is ready for insertion directly into the mold prior to the pouring of the molten metal. If desired, the dried sleeve may be externally wrapped with additional fibrous matting, e.g., one or more layers of fiber glass matting, prior to insertion into the mold in order to further insulate the poured hot metal from the mold. Of course, dimensional allowance of the sleeve must be made when employing one or more additional layers of fiber glass matting around the sleeve so that the sleeve can be inserted in the mold. The additional layer of fibrous matting may be varied in thickness depending upon the rate of cooling desired during the solidification of the ingot and depending upon the size of the ingot. In general, the additional one or more external layers of fibrous matting, e.g., fiber glass matting, do not melt during or after the teeming operation. Thus, the additional layers of porous fibrous matting serve as further avenues of escape for gaseous products in the melt. While the as-coated fibrous sleeve can be satisfactorily used alone in producing sound ingots, the embodiment of employing one or more additional layers of fiber glass or other fibrous matting wrapped around the coated sleeve has the additional advantage of enabling the consistent production of substantially sound ingots over a large range of sizes and having a larger length to diameter ratio. Heretofore, it has been difficult to produce long and narrow ingots from heat resistant alloys without the formation of excessive piping or center porosity and the excessive entrapment of non-metallic inclusions, particularly ingots of heat resistant, nickel-base alloys and other types of well-known heat resistant alloys.

While fiber glass has been found to be preferred in producing the mold lining provided by the invention, other types of fibrous, inorganic, glass-like materials may be employed provided the material at least partially fuses when contacted by the molten metal being cast. An example of such glass-like fibrous material is one containing about 45% to 75% $SiO_2$, about 0.09% to 17% total of $Al_2O_3$ and $Fe_2O_3$, up to about 20% CaO, up to about 9% MgO, up to about 10% $Na_2O$ and up to about 13% $B_2O_3$. Another glass-like material comprises about 40% to 80% $SiO_2$, about 12% to 18% $Al_2O_3$, up to about 20% $Fe_2O_3$, up to about 15% CaO, up to about 30% MgO and up to about 12% $Na_2O$. A type of blast furnace slag which would be suitable as a fibrous material comprises about 30% to 50% $SiO_2$, about 4% to 15% $Al_2O_3$, about 0.5% to 5% FeO, about 30% to 50% CaO, and about 0.3% to 20% MgO. Fibrous glass-like materials having a softening point of the order of about 1550° F. and higher have been found satisfactory.

As has been mentioned hereinbefore, the mold lining provided by the invention substantially overcomes many of the prior art difficulties, particularly in providing ingots or castings of improved metallurgical quality. Such ingots or castings are characterized by greatly minimized piping and center porosity, improved surface cleanliness and smoothness, lower inclusion count, etc. As an attendant improvement, ingot mold life is greatly enhanced. In fact, ingot molds that have been used with linings as provided by the invention have been filled many times without indication of deterioration of the mold wall. This service life is far beyond that which might be expected with previously known mold linings or washes or with unlined molds. Previous attempts to cast nickel-chromium alloys in cast iron molds measuring about 9¾ inches or 12 inches in diameter have not been generally satisfactory in that excessively dirty metal due to the entrapment of non-metallic inclusions during rapid solidification would occur. Small diameter ingots conventionally produced in such molds usually solidified so rapidly that not enough time was allowed for inclusions (e.g., products of deoxidation, dross and oxidized metal splash) to flow to the top of the ingot. However, when the unitary mold lining provided by the invention was employed in the aforementioned type of cast iron molds, ingots were obtained having greatly enhanced metallurgical quality from the standpoint of cleanness, soundness, etc., and which provided a greater yield of metal as finished mill products. In some instances, the narrow ingots obtained were as clean or cleaner than ingots conventionally cast in very large molds, e.g., molds measuring 18 inches square by 40 inches long.

For the purpose of giving those skilled in the art a better appreciation of the advantages of the invention, the following illustrative examples are given:

Example I

A commercial heat of a nickel-base heat resistant alloy sold under the trademark Inconel "M" was prepared in accordance with established practice having a nominal composition comprising about 16% chromium, 7% iron, 3% titanium, 2.25% manganese and the balance substantially all nickel and small amounts of such elements as carbon, aluminum, silicon, copper, sulfur, etc. One-half of the heat was cast according to regular casting practice into molds yielding ingots measuring 18 inches by 18 inches by 40 inches long while another part of the heat was cast into molds lined in accordance with the invention with a coated fibrous sleeve and yielding ingots measuring 9¾ inches in diameter by 28 inches long.

In producing ingots in accordance with regular practice, cast iron molds measuring 18 inches square by 40 inches long and having a one-inch taper were placed big end up on cast iron bases which had copper inserts, the copper inserts serving as copper bottoms for the ingot molds. A 12-inch tile head was employed as a hot top on each of the prepared ingot molds. A large heat of the aforementioned nickel-base alloy was tapped into a 5-ton teeming ladle from which the molten metal was poured into the molds at about 2900° F. through a 1¾-inch diameter nozzle. After completion of teeming, an electric arc was maintained at the hot top portion of the molds for about 20 minutes and the ingots then solidified and were removed from the molds. Upon examination, the ingots were found to have a rough surface caused by folding in of chilled metal, by the formation of cold shuts and by metal splash during teeming. The ingots were transferred hot to the forging shop for further processing where each ingot was charged into a hot furnace and heated to a temperature of 2225° F. prior to being forged. Each ingot was forged into a diameter of about 11 inches and cut into two pieces. The forged pieces were turned on a lathe to a diameter of about 10 inches, then reheated and forged into blooms having a cross section measuring 8 inches by 8 inches. The blooms were thereafter sent to the merchant mill where they were reheated and hot rolled to billets having a cross section measuring 3 inches by 3 inches. The billets were ground all over in accordance with regular practice and then reheated and further hot rolled to rods having a diameter of 2⁵⁄₃₂ inches. The hot rolled rods, after cooling, were thereafter subjected to further mechanical operations which included straightening of the rods in a Medart machine followed by Brightman turning of the rod to a diameter of 1³¹⁄₃₂ inch. The rods were then inspected for surface defects and were spot ground in accordance with regular practice to remove some of the defects prior to being electropickled. The rods were reinspected for surface defects and again spot ground in an attempt to remove the surface defects. Examination of the final product showed that the rods produced from the conventionally cast material had a relatively high seam count amounting to about 15 seams per lineal foot of rod despite all the cleaning operations. The final yield of metal based upon the weight cast was of the order of about 40%.

In producing ingots in accordance with the invention from the same heat of metal, zircon-coated fiber glass sleeves, prepared in accordance with the invention, were employed, each sleeve having an additional layer of fiber glass wrapped around its externally-coated surface. The thus-prepared fiber glass sleeves were then inserted into cast iron molds measuring 9¾ inches in diameter by 28 inches long. A hot top was employed on each of the molds comprising an exothermic material as shown by 6 of Fig. 2 of the drawing. The molten metal was teemed at about 2900° F. from a 5-ton ladle through a nozzle measuring 1¾-inch in diameter into a clay-graphite tundish placed on top of each mold. The metal entered the mold from the tundish through a 1½-inch diameter nozzle. The ingots produced in this manner were found to be substantially free from surface folding and cold shuts and other surface defects and had an as-cast surface quality similar to that shown by the ingot of Fig. 5 of the drawing. Each ingot was machined to an extrusion billet by turning the entire length on a lathe to a diameter of 8¾ inches. The thus-prepared billets were heated to a temperature suitable for extrusion and then hot extruded into rods measuring 2⁵⁄₃₂ inches in diameter. The extruded rods were then straightened in a Medart machine and then Brightman turned to a diameter of 1³¹⁄₃₂ inch. The rods were inspected and spot ground in accordance with regular practice prior to being electropickled and then further reinspected and spot ground as described hereinbefore. Examination of the final product produced in accordance with the invention showed that the centers of all the produced rods were substantially sound and had a relatively low seam count averaging 2.4 seams per lineal foot. Another heat of the same alloy produced in the same manner gave a seam count of only 5 seams per lineal foot of rod produced which even then had about 67% less seams per lineal foot than the material produced by regular practice. The final yield of metal based on the weight cast was of the order of about 57%.

Ordinarily in the preparation of Brightman turned rods of the nickel-base heat resistant alloy sold under the trademark Inconel "M" produced from metal obtained by conventional methods or regular methods, an average yield of about 40% based on the ingot weight is generally obtained. On the other hand, by employing the invention, yields have been obtained on the same alloy running as high as about 60%. In general, consistent yields have been obtained of at least 50% which correspond to an improvement gain of at least about 25% over the previous yields of about 40% obtained by conventional methods in producing this alloy. Translated into production terms, the aforementioned improvement gain means an increase in production capacity of about 25% or more with existing melting equipment. Thus, in accordance with conventional practice, it was necessary to cast 100 pounds of this alloy to produce 40 pounds of finished product based on an average yield of 40%. However, in accordance with the present invention, only 80 pounds of this alloy need be cast to produce 40 pounds of finished product based on a yield of 50%. In addition to obtaining greater yields on the aforementioned alloy, the finished product provided by the invention was as clean as, if not cleaner than, the finished product produced by conventional methods. For example, it was not uncommon to find rods obtained from ingots produced by conventional methods which contained an average of 15 seams per lineal foot of rods of 1³¹⁄₃₂ inch in diameter as compared to less than an average of 4 seams per lineal foot of rod 1³¹⁄₃₂ inch in diameter obtained from ingots produced in accordance with the invention.

Example II

A commercial heat of another nickel-base heat resistant alloy sold under the trademark Nimonic "80" was prepared in accordance with established practice having a nominal composition comprising about 20.5% chromium, 2.4% titanium, 1.2% aluminum, 0.9% iron, 0.6% manganese and the balance substantially all nickel, including small amounts of carbon, silicon, copper, sulfur, etc. In producing ingots measuring 9½ inches in diameter by 25 inches long in accordance with the invention, cast iron molds were prepared for the casting operation by inserting a zircon-coated fiber glass sleeve into each of the molds. An exothermic hot top collar was then placed in a recess at the top of each of the molds. The heat was then tapped into a 5-ton ladle and teemed into the molds at about 2900° F. by pouring the heat through a preheated clay-graphite tundish resting on top of each mold as described in Example I. After each mold was filled, the tundish was removed and additional exothermic material placed on top of the ingot. After about one hour, the ingots were stripped from the molds and were cooled to room temperature.

Each ingot was machined over the entire length to a diameter of about 8¾ inches and cut into extrusion billets. The billets were then heated to a temperature of about 2175° F. to 2200° F. and extruded into long bars having a cross section measuring 2 inches by 2 inches. The bars were thereafter cut into billet bars weighing about 70 pounds which were subjected to cleaning by surface grinding. The ground billets were then heated to a suitable hot rolling temperature and hot rolled to rods having diameters ranging from about $1\frac{1}{16}$ inch to $1\frac{5}{16}$ inch. The hot rolled rods were then straightened in a Medart machine followed by centerless grinding of the surface to a diameter ranging from about ⅝ inch to ⅞ inch. The centerless-ground rods were then inspected and cut to length to produce the final product. Examination of the final product showed that the centers of the rods were substantially sound and that the seams amounted to a total length of only about 18 inches in over 3000 lineal feet of inspected rods. The yield based on cast weight was of the order of about 50%. When similar rods were produced in accordance with regular practice, the centers were not always sound and it was not uncommon to find seams amounting to a total length of about 300 inches to 420 inches per 3000 lineal feet of inspected rods. The yield of final product produced in accordance with regular practice would generally be of the order of about 35% to 40% of the weight of metal cast. The product produced in accordance with the invention was not only produced with a significantly higher yield but also was considerably less seamy than the final product obtained in accordance with regular practice.

*Example III*

As has been mentioned hereinbefore, the mold lining provided by the invention is particularly applicable to the production of special heat-resisting alloys which are normally difficult to hot work. A special heat-treatable nickel-chromium-cobalt heat-resisting alloy which has been successfully produced in the wrought form in accordance with the invention had the following nominal composition: about 29% cobalt, 15.5% chromium, 3% molybdenum, 1% iron, 2% titanium, 3% aluminum and the balance substantially all nickel plus small amounts of carbon, manganese, silicon, copper, sulfur, etc. The alloy was prepared in accordance with established practice and was poured, similarly as described in Examples I and II, into cast iron molds measuring 9¾ inches in internal diameter by 25 inches to 28 inches long, each of which contained a mold lining provided by the invention comprising a zircon-coated fiber glass sleeve. The ingots, after solidification, were removed from the molds, machined to extrusion billets, the billets then heated to a temperature suitable for extrusion and thereafter extruded into rods measuring about 3¼ inches in diameter. The rods were cleaned as described in Examples I and II and then heated to a suitable hot working temperature after which they were hot rolled into billets having a cross section measuring about 2 inches by 2 inches. The billets were then hot rolled into rods measuring ¾ inch in diameter. The rods were thereafter ground or machined to size, electropickled and then inspected. The rods of the special alloy produced in accordance with the invention were substantially seam free and had sound centers. The yield of final product based on the actual weight of metal cast was of the order of about 40% to 45%. The rods produced in the aforedescribed manner had improved metallurgical quality and an improved yield of finished mill product was obtained as compared to the conventional practice utilizing unlined ingot molds in producing this alloy.

*Example IV*

Ingots measuring about 9¾ inches in diameter and about 28 inches long comprised of an age-hardenable, nickel-base, heat resistant alloy sold under the trademark Inconel "X" were produced by employing the special mold lining provided by the invention similarly as described in the previous examples. This alloy had a nominal composition comprising about 15% chromium, 7% iron, 2.4% titanium, 0.8% aluminum, 0.9% columbium plus tantalum, 0.7% manganese, 0.4% silicon and the balance substantially all nickel, including small amounts of carbon, copper, sulfur, etc. The ingots were prepared for extrusion as described hereinbefore and then hot extruded to rods measuring 2 inches in diameter. The rods were then Brightman turned to a diameter of 1¾ inch. Inspection revealed that the Brightman turned rods were substantially seam free and had a final yield based on the cast weight of metal of about 55%. When rods of the same alloy are produced in accordance with conventional practice, it is not uncommon for the rods (i.e., Brightman turned rods measuring 1¾ inch in diameter) to exhibit 15 seams per lineal foot. Generally, the yield of this size product produced conventionally is of the order of about 40% based on the weight of metal cast.

*Example V*

Good results have also been obtained with an age-hardenable, nickel-chromium-cobalt alloy normally considered difficult to hot work. This alloy, which is sold under the trademark Nimonic "90" had the following nominal composition: about 20.5% chromium, 17% cobalt, 2.3% titanium, 1.5% aluminum, 0.7% iron, 0.6% manganese, 0.4% silicon and the balance substantially all nickel plus small amounts of carbon, copper, sulfur, etc. Ingots measuring 9¾ inches in diameter by 28 inches long were produced as described hereinbefore by casting the molten alloy in specially-lined molds in accordance with the invention. The ingots were likewise prepared into extrusion billets and hot extruded to bars having a cross section measuring 3 inches by 3 inches which were cut into billets suitable for hot rolling. The billets were ground in the usual manner to clean up the surface and then hot rolled to billets having a cross section measuring 2 inches by 2 inches, spot ground and hot rolled to rods measuring about ¾ inch in diameter. The hot rolled rods were then centerless ground to produce a final product having a diameter of about $1\frac{1}{16}$ inch. Inspection of the centerless-ground rods showed that the material had markedly improved quality and was as clean as or cleaner than the same product produced from large ingots rolled and forged by regular practice. The final yield based on the weight of metal cast was of the order of about 45%. When the same material was produced in accordance with conventional practice, it was not uncommon for the same size rods to exhibit a larger seam count per lineal foot and a final yield of about 35% based on the actual weight of metal cast.

It will be apparent from the foregoing examples that marked improvements in metal quality and in overall yield of useful metal products are obtained when casting metal in accordance with the invention. It is believed that the unexpected results achieved are due in part to the partial melting of the fibrous lining adjacent the molten metal which exerts a cleansing, a lubricating and/or a fluxing action on molten metal being cast. In prior practice, it was not uncommon for ingots to develop transverse cracking in the mold during solidification caused by "hanging" of the hot-topped ingots. The "hanging" of such ingots is usually caused by fins forming over the top of a hot-topped mold such that during solidification the ingot tends to pull itself apart below the hot top region due to shrinkage. The invention also minimizes this type of failure, apparently because the partially fused lining enables the ingot to move freely during its contraction away from and along the protected mold surface. Furthermore, it is believed the lining when partially fused aids in forming a smooth cast surface capable of detaching itself easily from the mold without cracking, etc. The remaining fibrous matting and refractory cement of the lining provide the necessary insulation required to delay solidification for a time sufficient to allow dross and products of deoxidation to float out of the molten metal and also to promote good feeding of the molten metal into the center of the ingot, thus minimizing piping and center porosity. One advantage of the mold lining provided by the invention is that it obviates the necessity of preheating the mold prior to filling it with molten metal which is a characteristic practice in conventionally preparing molds. It is preferred that the mold containing the mold lining, if preheated at all, not be preheated to a temperature which would soften or incipiently soften the lining. In practice, lined molds employed in accordance with the invention need only sufficient preheating to insure absence of moisture.

Figure 1:
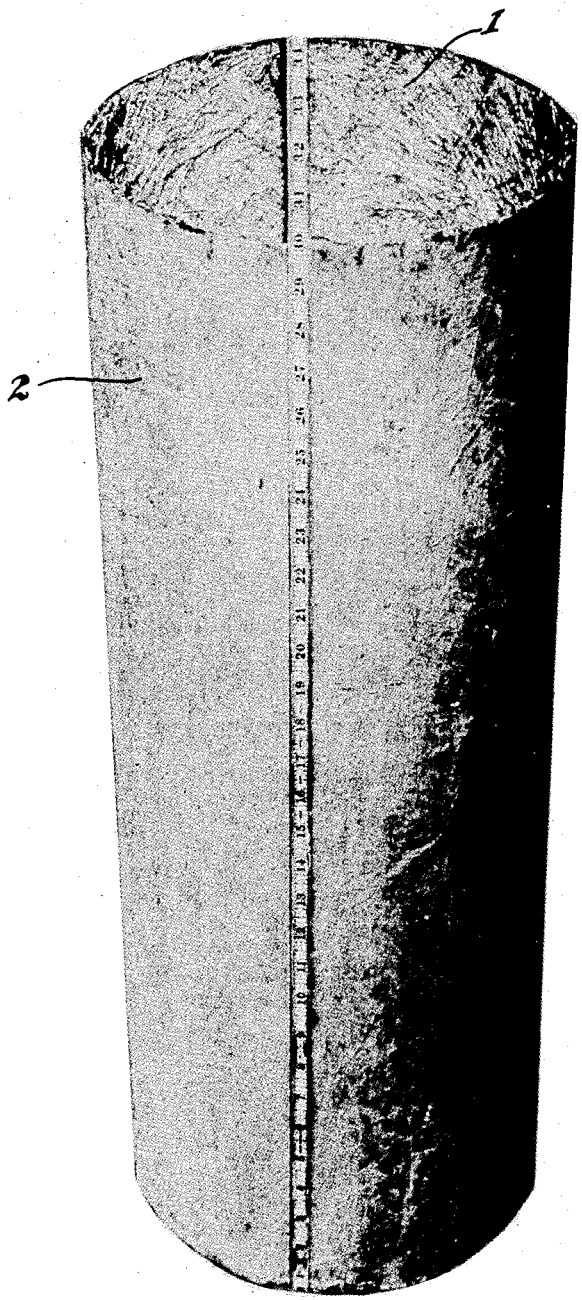
Fig. 1 is a reproduction of a photograph taken at about one-third actual size showing an embodiment of the mold lining provided by the invention.

An embodiment of the novel lining provided by the invention is illustrated by Fig. 1 which is a reproduction of a photograph of an actual unitary, refractory-coated, fibrous lining for insertion into a mold. Thus, Fig. 1 shows a lining comprising a zircon-coated, fiber glass sleeve for a round mold in which the internal or molten metal-contacting surface 1 of the lining comprises a fiber glass mating and the external or mold-conforming surface 2 is zircon coated. Fig. 2 illustrates a longitudinal section of an embodiment of a round metal mold 3 having a hot top 6 comprising an exothermic material and showing the positioned fiber glass lining 4 with refractory coating 7 integral therewith, the coated lining 4 being wrapped with a layer of fiber glass matting 5. Fig. 3 is an enlarged fragmentary sectional view of a portion of the lined mold of Fig. 2 showing fiber glass lining 4 with refractory coating 7 adjacent the wrap-around layer of fiber glass matting 5, said fiber glass layer 5 being in substantially non-adherent relation to the wall of mold 3.

Figure 4:
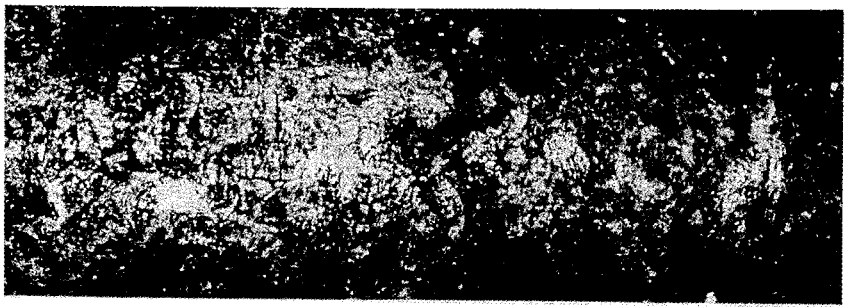
Figs. 4 and 5 are reproductions of photographs taken at about one-third actual size depicting the surface quality of an ingot casting produced in accordance with conventional casting practice and of an ingot casting produced in accordance with the invention, respectively.
Figure 5:
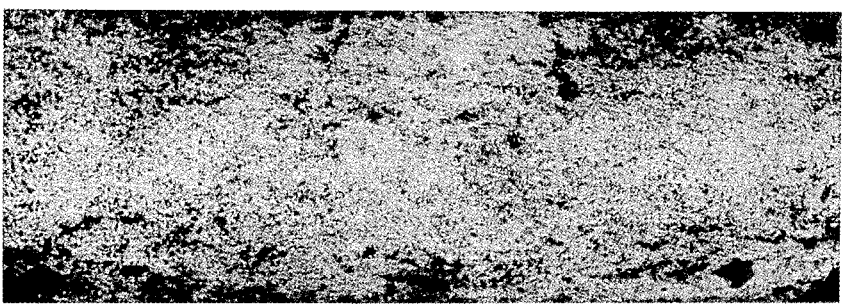

As has been pointed out hereinbefore, the surface quality of ingots produced in accordance with the invention is improved over the type of surface obtained by conventional casting procedures. This is illustrated by referring to Figs. 4 and 5 which show the surface quality of a cast ingot produced in accordance with conventional casting procedure and of a cast ingot produced in accordance with the invention, respectively. Thus, Fig. 4 depicts the cast surface of a heat resistant nickel-base alloy ingot sold under the trade-mark Nimonic "80" as cast in a round mold measuring 9¾ inches in diameter by 28 inches long and shows the folded surface with entrapped dross and cold shuts typical of ingots cast by conventional methods. Fig. 5, which is a same size casting of the same alloy, shows by comparison the relatively uniform as-cast surface of the ingot of substantially improved quality with little or no surface folding, entrapped dross and cold shuts when the ingot is produced in accordance with the invention by casting in a mold prepared with a zircon-coated fiber glass lining.

Figure 6:
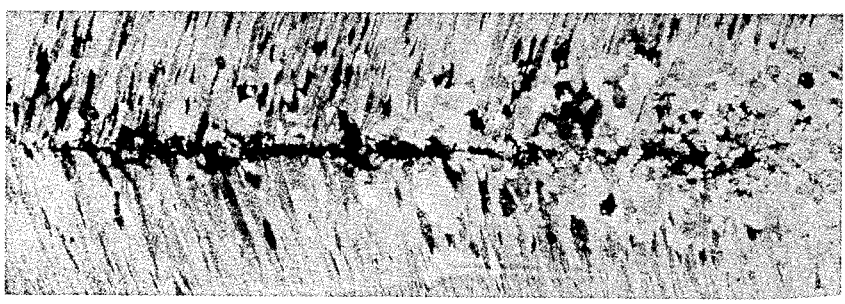
Figs. 6 and 7 are reproductions of photographs taken at about one-third actual size showing longitudinal sections of cast ingots produced by a prior procedure and produced in accordance with the invention, respectively.
Figure 7:
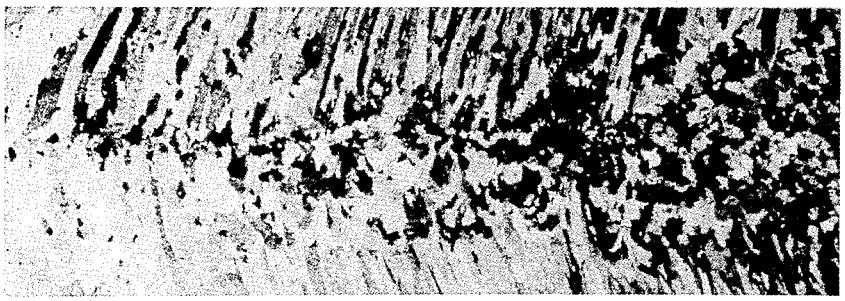
Figure 8:
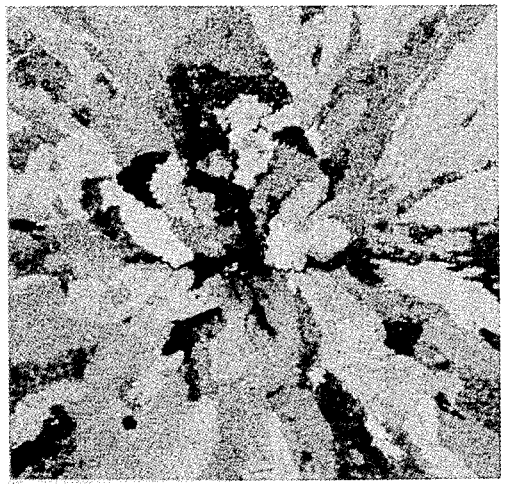
Figs. 8 and 9 are reproductions of photomacrographs taken at about 1.5 times actual size depicting transversely the center of cast ingots produced in accordance with conventional practice and produced in accordance with the invention, respectively.
Figure 9:

As illustrative of the advantages to be obtained by the invention in producing ingots of sound, internal structure, attention is directed to Fig. 6 and Fig. 7. Fig. 6 shows an etched longitudinal section of a cast ingot produced by a prior procedure depicting the center porosity typical of such ingots. Fig. 7 shows an etched longitudinal section of a cast ingot produced in accordance with the invention using a zircon-coated fiber glass sleeve as a mold lining. It will be noted from Fig. 7 that the center of the ingot is considerably more sound than the ingot of Fig. 6. Fig. 8 is an etched transverse section of the center of an ingot of Nimonic "80" cast by conventional procedure taken at about 1.5 times actual size showing the extent of the center porosity typical of such conventionally cast ingots. Fig. 9, on the other hand, which is a similar transverse section taken at about 1.5 times actual size of an ingot of the same alloy cast in accordance with the present invention utilizing a zircon-coated fiber glass sleeve for a mold lining, shows by comparison practically no center porosity. Fig. 10 and Fig. 11, which are similar to Figs. 8 and 9, respectively, but taken at a lower magnification, show the overall macrostructure of the whole transverse section of the ingots taken at about one-half actual size. It will be noted that the macrostructure of Fig. 11 shows a grain structure typical of ingots obtained by controlled slow cooling with the fiber glass lining as compared to the different macrostructure of Fig. 10 which is typical of chilled cooling showing center porosity obtained in conventional casting practice. It is difficult to obtain sound ingots free from center porosity and surface imperfections when the ingots are chill cast. However, by employing the invention, the molten metal can be cooled more slowly in the mold to produce sound ingots of greatly enhanced quality while at the same time effecting substantially improved mold life.

The improved metallographic quality obtained in a heat treatable nickel-chromium-cobalt alloy produced in accordance with the invention is also illustrated by referring to Fig. 12 and Fig. 13. Fig. 12 is a reproduction of a photomicrograph taken at 500 diameters of a rod produced from a heat treatable nickel-chromium-cobalt alloy cast by conventional practice. It will be noted from the photomicrograph that the alloy rod has numerous inclusions and is not generally considered to be of good quality. This material had a high inclusion count of about 114 for the area shown in Fig. 12. Brightman turned rods of this material exhibited a high seam count averaging about 20 seams per lineal foot. Fig. 13, which is a reproduction of a photomicrograph taken at the same magnification of a rod produced from the same heat treatable nickel-chromium-cobalt alloy cast in accordance with the invention, shows that by comparison the metal is much cleaner and contains very few non-metallic inclusions. This material had a low inclusion count of about 40 for the area shown in Fig. 13. Brightman turned rods of this alloy exhibited a relatively low seam count of about 4 seams per lineal foot.

Generally, the present invention is widely applicable to the casting of metals and alloys, particularly those having a melting point above about 1600° F. For example, the invention is applicable to the casting of alloys comprising at least about 40% total of the group manganese, iron, cobalt, nickel and copper. Such alloys may contain up to about 50% manganese, up to about 98% iron, up to about 60% cobalt, up to about 98% nickel and up to about 98% copper. Important alloying elements which may be present in the alloy include up to about 45% chromium, up to about 40% molybdenum and up to about 40% tungsten. Other alloying or incidental elements which may also be present in the alloy to which the invention is applicable include up to about 15% aluminum, up to about 15% titanium, up to about 1% zirconium, up to about 10% vanadium, up to about 10% columbium, up to about 10% tantalum, up to about 10% silicon, up to about 10% beryllium, up to about 40% zinc, up to about 20% tin, up to about 5% magnesium, up to about 1% cerium, up to about 1% calcium, up to about 2% carbon, up to about 1% boron, etc. Included among the metals that can be cast in accordance with the invention are nickel, iron and copper.

The invention is particularly applicable to the casting of heat resistant chromium-containing alloys, including, for example, the alloys of nickel-chromium, nickel-chromium-iron (such as nickel-base alloys and stainless steels), nickel-chromium-cobalt, nickel-chromium-iron-cobalt, iron-chromium, etc. Such heat resistant alloys can be cast into ingots, slugs or the like for subsequent conversion into wrought products by hot extrusion methods; although when the cast metal is subjected to other hot working operations, the benefits of the present invention are also realized.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. As an article of manufacture, a composite mold lining for use in combination with a mold in the production of metal castings of improved metallurgical quality from molten metal which consists essentially of a substantially flexible, sleeve-like structure having an internal surface comprising a substantially fibrous, non-combustible when in contact with said molten metal, porous matting of inorganic, glassy material which has a softening point of at least about 1550° F. and an external surface having a coating comprising a high melting point, inorganic refractory material substantially integral therewith, and a wrapping of at least one layer of substantially fibrous, non-combustible matting around said coated external surface.

2. As an article of manufacture, a composite mold lining for use in combination with a mold in the production of metal castings of improved metallurgical quality from molten metal which consists essentially of a substantially flexible, sleeve-like structure having an internal surface comprising a substantially fibrous, non-combustible when in contact with said molten metal, flexible matting of inorganic, glassy material which has a softening point of at least about 1550° F. and an external surface having a coating comprising a high melting point, inorganic refractory oxide substantially integral therewith and a wrapping of at least one layer of substantially fibrous, non-combustible matting around said coated external surface.

3. A casting mold consisting essentially of a chamber adapted to receive molten metal and a substantially flexible, sleeve-like, composite mold lining in said chamber and conforming substantially to the surface configuration of the mold chamber, said flexible, sleeve-like lining having an internal surface comprising a substantially fibrous, non-combustible when in contact with said molten metal, porous matting of inorganic, glassy material which has a softening point of at least about 1550° F. and adapted to at least partially fuse when contacted by molten metal and an external surface having a coating comprising a high melting point, inorganic refractory material substantially integral therewith and a wrapping of at least one layer of a substantially fibrous, non-combustible matting around said coated external surface, said wrapping of matting being adjacent the surface of said mold chamber.

4. A casting mold consisting essentially of a chamber adapted to receive molten metal and a substantially flexible, sleeve-like, composite mold lining in said chamber and conforming substantially to the surface configuration of the mold chamber, said flexible, sleeve-like lining having an internal surface comprising a substantially fibrous, non-combustible when in contact with said molten metal, porous matting of inorganic, glassy material which has a softening point of at least about 1550° F. and adapted to at least partially fuse when contacted by molten metal and an external surface having a coating comprising a high melting point, inorganic refractory oxide substantially integral therewith and a wrapping of at least one layer of a substantially fibrous, non-combustible matting around said coated external surface, said wrapping of matting being adjacent the surface of said mold chamber and in substantially non-adherent contact therewith.

5. A method of producing improved metal ingots by pouring molten metal having a melting point above about 1600° F. into a metal-confining chamber of an iron ingot mold which comprises providing a substantially flexible, sleeve-like, composite mold lining having an internal surface comprising a substantially fibrous, non-combustible when in contact with said molten metal, inorganic, glassy material which has a softening point of at least about 1550° F. and which at least partially fuses when contacted by molten metal and a coated external surface comprising a high melting point, inorganic, refractory oxide, said coated surface conforming substantially to the surface configuration of the mold chamber, inserting said sleeve-like, composite mold lining into the metal-confining chamber of said mold so that the external surface of said lining is in substantially non-adherent contact with the surface of said mold chamber, said mold chamber being at least about 7 inches in width, pouring said molten metal into the thus-lined mold to partially fuse said glassy material and then solidifying the molten metal therein, whereby an ingot having improved metallurgical quality is obtained.

6. A method of producing improved metal ingots by pouring molten metal having a melting point above about 1600° F. into a metal-confining chamber of an iron mold which comprises providing a substantially flexible, sleeve-like, composite mold lining having an internal surface comprising a substantially fibrous, non-combustible when in contact with said molten metal, inorganic, glassy material said fiber glass having a softening point of at least about 1550° F. and which at least partially fuses when contacted by molten metal and an external surface having a coating of a high melting point, inorganic refractory material thereon and a wrapping of at least one layer of substantially fibrous, non-combustible, flexible matting around said coated external surface and said composite mold lining conforming substantially to the surface configuration of the mold chamber, inserting said sleeve-like, composite mold lining into the metal-confining chamber of said mold so that said wrapping of matting is in substantially non-adherent contact with the surface of said mold chamber, said mold chamber being at least about 7 inches is width pouring said molten metal into the thus-lined mold to partially fuse said glassy material and then solidifying the molten metal therein, whereby an ingot having improved metallurgical quality is obtained.

7. A method of producing improved metal ingots by pouring molten metal having a melting point above about 1600° F. into a metal-confining chamber of a mold which comprises providing a substantially flexible, sleeve-like, composite mold lining having an internal surface comprising fiber glass which is non-combustible when in contact with said molten metal, said fiber glass having a softening point of at least about 1550° F. and which at least partially fuses when contacted by molten metal and a coated external surface comprising a high melting point, inorganic refractory oxide and a wrapping of at least one layer of fiber glass around said coated external surface conforming substantially to the surface configuration of the mold chamber, said mold chamber being at least about 7 inches in width, inserting said sleeve-like, composite mold lining into the mold so that said wrapping of fiber glass is in substantially non-adherent contact with the surface of said mold chamber, pouring said molten metal into the thus-lined mold to partially fuse said fiber glass internal surface and then solidifying the molten metal therein, whereby an ingot having improved metallurgical quality is obtained.

8. As an article of manufacture, a composite mold lining for use in combination with a casting mold in the production of metal castings of improved metallurgical quality from molten metal which consists essentially of a substantially flexible, sleeve-like structure having an internal surface comprising a porous matting of fiber glass substantially non-combustible in contact with said molten metal and which at least partially fuses when contacted by said molten metal and an external surface having a coating comprising a high melting point, inorganic refractory material substantially integral therewith, and a wrapping of at least one layer of substantially non-combustible porous matting of fiber glass around said coated external surface.

9. A casting mold consisting essentially of a chamber adapted to receive molten metal and a substantially flexible, sleeve-like, composite mold lining in said mold chamber and conforming substantially to the surface configuration of the mold chamber, said flexible, sleeve-like lining having an internal surface comprising a porous matting of fiber glass substantially non-combustible when in contact with said molten metal and adapted to at least partially fuse when contacted by said molten metal and an external surface adjacent the surface of the mold chamber, the external surface of said sleeve-like, composite lining having a coating comprising a high melting point, inorganic refractory material substantially integral therewith.

10. A method for producing metal ingots having improved surface characteristics and metallurgical quality which comprises providing a sleeve-like composite mold lining having an internal surface consisting essentially of fiber glass and a coated external surface comprising a high melting point inorganic refractory oxide, said refractory being applied in the amount of about 0.1 to about 1 pound per square foot of lining surface; inserting said sleeve-like composite mold lining into an iron ingot mold having a cavity at least about 7 inches and up to about 13 inches wide so that the external surface of said lining is in substantially non-adherent contact with the inner surface of said ingot mold, pouring molten heat-resistant nickel-containing metal into the thus-lined mold to partially fuse said fiber glass and then solidifying the molten metal within the lined mold.

References Cited in the file of this patent
UNITED STATES PATENTS

| | | |
|---|---|---|
| 1,249,101 | Jacobs | Dec. 4, 1917 |
| 1,743,932 | Reed | Jan. 14, 1930 |
| 1,882,882 | Poe | Oct. 18, 1932 |
| 2,304,879 | Brazil | Dec. 15, 1942 |
| 2,378,699 | Gunn | June 19, 1945 |
| 2,478,165 | Collins | Aug. 2, 1949 |
| 2,702,927 | Travis | Mar. 1, 1955 |

OTHER REFERENCES

Bacon: Abstract of Appl. Serial No. 610,591 (filed Aug. 13, 1945), published Sept. 20, 1949, 626 O.G. 871.